US008281547B2

(12) United States Patent
Hettick

(10) Patent No.: US 8,281,547 B2

(45) Date of Patent: Oct. 9, 2012

(54) MODULAR TOWER APPARATUS AND METHOD OF MANUFACTURE

(75) Inventor: Steven A. Hettick, Bellingham, WA (US)

(73) Assignee: Ershigs, Inc., Bellingham, WA (US)

(*) Notice: Subject to any disclaimer, the term of this patent is extended or adjusted under 35 U.S.C. 154(b) by 0 days.

(21) Appl. No.: 12/883,963

(22) Filed: Sep. 16, 2010

(65) Prior Publication Data

US 2011/0061332 A1 Mar. 17, 2011

Related U.S. Application Data

(60) Provisional application No. 61/243,375, filed on Sep. 17, 2009.

(51) Int. Cl.
*E04C 3/00* (2006.01)

(52) U.S. Cl. ........... 52/745.17; 52/834; 52/841; 52/843; 52/844; 52/845; 52/847; 52/848; 52/852; 52/854

(58) Field of Classification Search .................... 52/834, 52/841, 843, 844, 845, 847, 848, 852, 854
See application file for complete search history.

(56) References Cited

U.S. PATENT DOCUMENTS 3,331,907 A * 7/1967 Salzinger ...................... 264/313
5,462,623 A 10/1995 Day
5,513,477 A * 5/1996 Farber ............................. 52/848
5,589,243 A 12/1996 Day
5,704,187 A * 1/1998 Hosford et al. ................. 52/848
5,834,082 A 11/1998 Day
6,740,381 B2 5/2004 Day et al.
7,393,572 B1 7/2008 Monk et al.
7,426,807 B2 * 9/2008 Cadwell et al. ................. 52/834
7,866,121 B2 * 1/2011 Polyzois et al. ................ 52/848
7,877,935 B2 * 2/2011 Ollgaard ........................... 52/40
2002/0121712 A1 * 9/2002 Schroeder .................... 264/40.1
2004/0020158 A1 2/2004 Kopshever, Sr.
2005/0283978 A1 12/2005 Kopshever, Sr.
2007/0003650 A1 * 1/2007 Schroeder ....................... 425/71
2009/0019816 A1 * 1/2009 Lockwood et al. ............. 52/848
2009/0211173 A1 * 8/2009 Willey et al. ...................... 52/40
2009/0266004 A1 10/2009 Willey et al.
2011/0047900 A1 * 3/2011 Holmes ........................ 52/173.1
2011/0132525 A1 * 6/2011 Xia .............................. 156/191

FOREIGN PATENT DOCUMENTS

KR 202001000612 1/2001
WO WO2005028781 A2 3/2005

* cited by examiner

*Primary Examiner* — Mark Wendell

(74) *Attorney, Agent, or Firm* — Cantor Colburn LLP

(57) ABSTRACT

In one aspect, a method of making a selected structure using composite materials is disclosed, which method in form includes providing a plurality of members each comprising a composite material, wherein each member is configured to be coupled to at least one other member in the plurality of members along a longitudinal side; coupling onsite the plurality of members along their longitudinal sides to form a base enclosed structure; and reinforcing onsite the base enclosed structure to form the selected structure.

18 Claims, 13 Drawing Sheets

MODULAR TOWER APPARATUS AND METHOD OF MANUFACTURE

CROSS-REFERENCE TO RELATED APPLICATION

This application takes priority from U.S. Provisional Patent Application Ser. No. 61/243,375, filed Sep. 17, 2009.

BACKGROUND OF THE DISCLOSURE

1. Field of the Disclosure

This application relates to producing large composite structures, including towers. In one form, the towers are utilized to support a nacelle of a wind-powered turbine. In one form, a portion of the production of the tower is accomplished offsite, with final assembly accomplished onsite.

2. Brief Description of the Related Art

Composite materials are utilized to make a variety of structures, some quite large. Wind turbine towers are relatively large structures, typically up to about 20 ft. in bottom diameter and up to about 300 ft. in height (or higher). Such towers are generally made from metal alloys that are relatively heavy and expensive to manufacture. Also, such large structures are difficult to transport due to size restrictions associated with the transportation of objects over land. Therefore, it has been proposed to fabricate such towers in smaller sections and then transport and assemble such smaller sections onsite. Still, each section is relatively long and some such sections are too large in diameter for transportation. Towers made using composite materials or a combination of composite materials and metallic materials (a hybrid design) may offer viable alternatives to current all metallic towers. It may also be desirable to make other large structures, such as large storage tanks, using composite or hybrid materials.

The disclosure herein provides methods of making large structures utilizing composite or hybrid materials.

SUMMARY

In one aspect, a method of making a large composite structure is provided, which method may include providing a plurality of members each comprising a composite material, wherein each member is configured to be coupled to at least one other member in the plurality of members along a longitudinal side, coupling onsite the plurality of members along their longitudinal sides to form a base unit, and reinforcing onsite the base to form the selected structure.

Examples of certain features of the apparatus and method disclosed herein are summarized rather broadly in order that the detailed description thereof that follows may be better understood. There are, of course, additional features of the apparatus and methods disclosed hereinafter that will form the subject of the claims appended hereto.

BRIEF DESCRIPTION OF THE DRAWINGS

For detailed understanding of the present disclosure, references should be made to the following detailed description, taken in conjunction with the accompanying drawings, in which like elements have generally been given like numerals and wherein.

DETAILED DESCRIPTION

In one aspect, the disclosure herein provides a method for producing a composite structure. The method for manufacture, in one manner, may be accomplished in the field (also referred to as "onsite"), therefore reducing transportation costs of the structure from an offsite location to the field. Specifically, the structure in one form may be a support tower for a nacelle for wind power generation. The support towers, for example, may range from 100 ft. to 400 ft. Some such towers may include several unitary base or modular structures 50 ft. long (or longer). As the support towers for wind power generation increase in height, their base diameters substantially increase. As the base diameter of a tower increases beyond the convenient transportation range, such as diameters larger than 15 ft., transportation of the unitary sections becomes increasingly difficult. Thus, in one aspect, disclosed herein is a method for producing the unitary base structures comprising modular panels, and combining such unitary base structures to produce large structures, such as wind turbine towers. In one aspect, the unitary base structures may be conic sections (cylindrical or other suitable forms) as modular components, wherein the final assembly of the tower may be accomplished in the field. In another aspect, the tower may be a hybrid design. Other large structures, including, but not limited to, storage tanks, etc, may also be produced using the methods described herein.

Figure 1A:
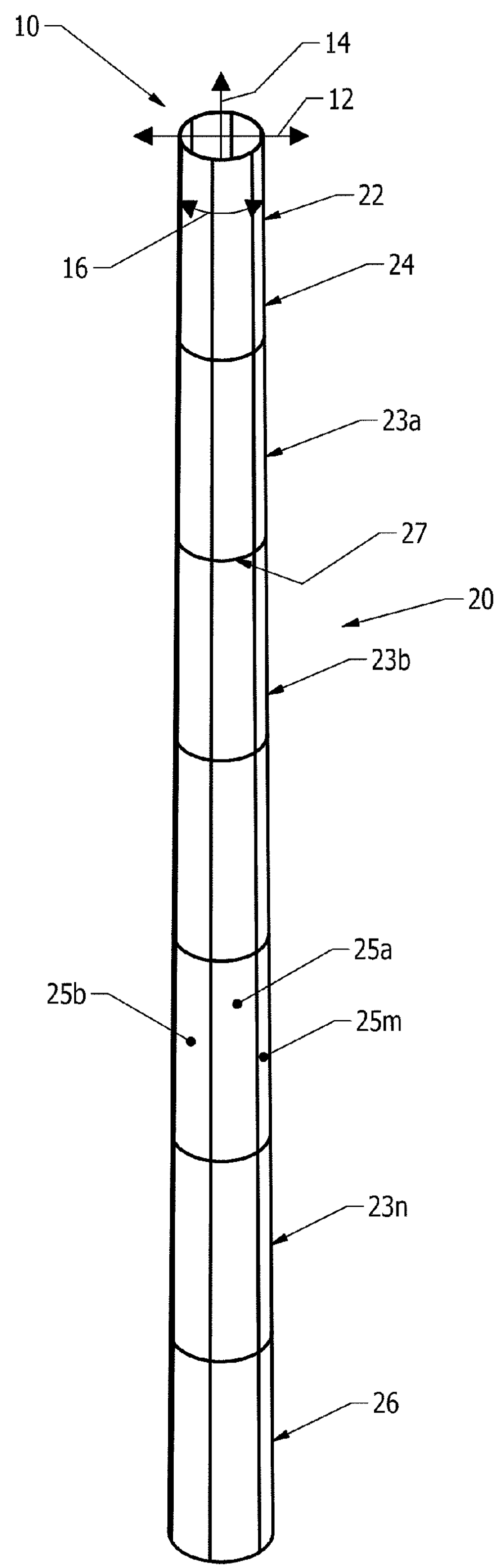
FIG. 1A is an isometric view of a tower made by interconnecting a plurality of conic sections, according to one embodiment of the disclosure.

FIG. 1A shows a line diagram of an exemplary tower 20 comprising a plurality of base structures in the form of conic sections 22, with a top conic section 24 and a bottom conic section 26. While the term "conic" sections is used, the term is also intended to include "cylindrical" or "substantially cylindrical" sections, wherein each may include, in one form, a tapered section at an end of the cylindrical section functioning as a reducer. Intermediate conic sections 23*a*, 23*b* . . . 23*n* may be connected or applied between the bottom conic section 26 and the top conic section 24 until the desired height is achieved. In one aspect, each conical section includes a number of longitudinally interconnected panels 25*a*, 25*b* . . . 25*m* and may further include desired reinforcements. In aspects, each conic section may be more that 12 ft. in diameter and more than 30 ft. in length. For ease in understanding the manufacturing process, the method of making tower 20 will be described as making several individual components, such as building individual panels, combining or integrating the individual panels to form conic sections, and combining the conic sections to form the tower structure 22, as described in more detail in reference to FIGS. 2-12.

The exemplary tower 20 (FIG. 1A) includes an axis system 10 which generally comprises a radially outward axis 12, a longitudinal axis 14 and a tangential (also referred to as circumferential) axis 16. The tangential axis 16 scribes a circle around the longitudinal axis 14. This axis system 10 is incorporated for ease of understanding only and is not intended to be limiting in any manner.

Figure 1B:
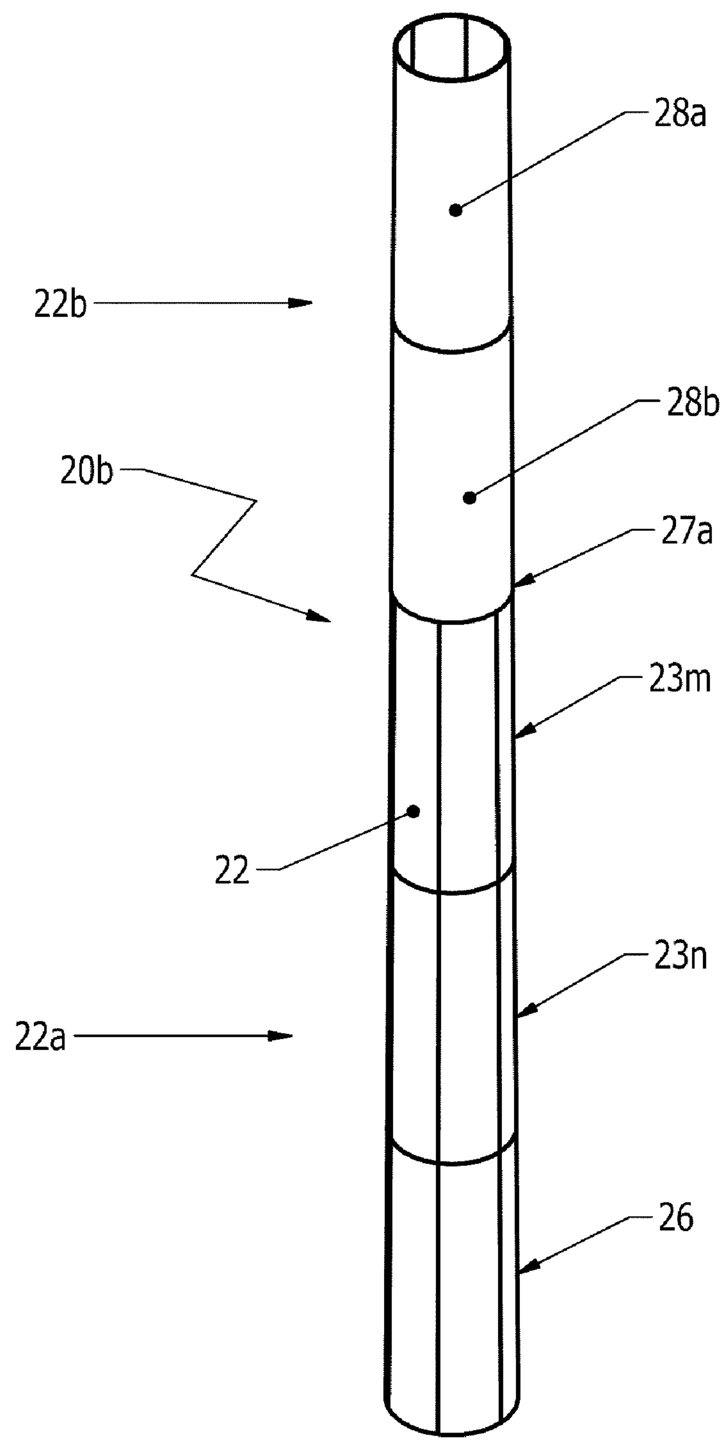
FIG. 1B is an isometric view of a tower made by interconnecting a plurality of conic composite sections, with a separate portion of the tower comprised of a non-composite material, such as steel.

FIG. 1B shows an exemplary tower 20*b* comprising a hybrid design or construction. In one aspect, the tower 20*b* may include one or more composite conic sections and one or more metallic and/or alternate material sections. In a particular configuration, a lower portion 22*a* of the tower 20*b* may include a base structure that includes one or more conic sections, including a composite base conic section 26 and composite intermediate conic sections 23*n* and 23*m*. These composite sections may be joined at joint 27*a* with an upper portion 22*b* of the tower 20. The upper section 22*b* may include individual sections, such as sections 28*a* and 28*b*, constructed with a suitable alternate material, such as carbon steel. In one aspect, such a hybrid design or approach allows the use of modular composite panel construction method, described in reference to FIGS. 2-12, for larger diameter conic sections, such as conic sections 23*n* and 26, where transportation of such large sections becomes inconvenient or impossible. Where the upper tower sections, such as sections 28*a* and 28*b*, taper in diameter to sizes that are more practical to transport, traditional tower fabrication methods with alternate materials, such as carbon steel, may be employed and coupled at joint 27*a* to the lower composite tower section 22*a* via mechanical or other connections, including, but not limited to, a bolted flange during the onsite erection/assembly process.

Figure 1C:
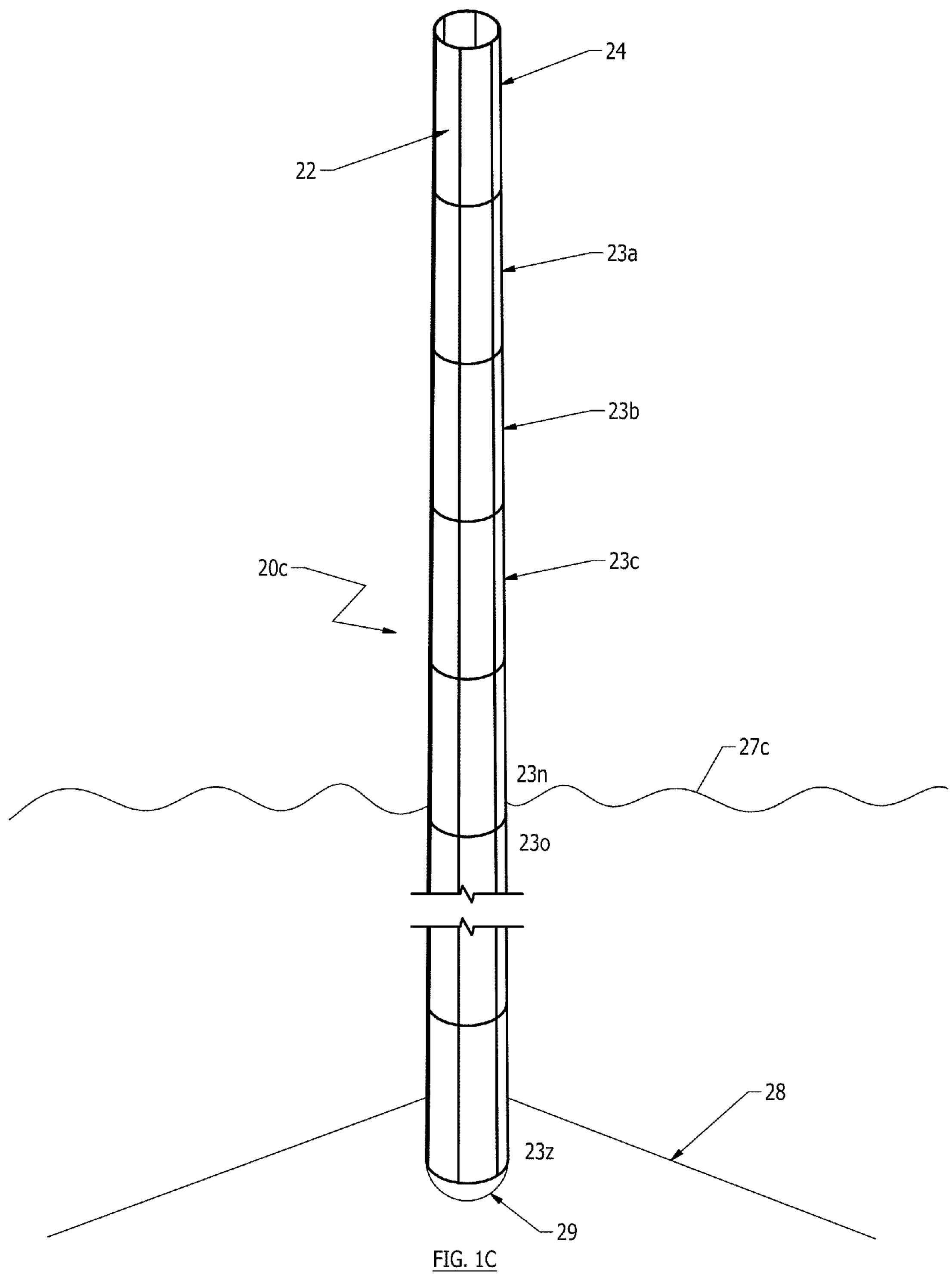
FIG. 1C is an isometric view of an off-shore floating tower made by interconnecting a plurality of conic composite sections with a vertical spar below the water surface.

FIG. 1C illustrates an exemplary offshore floating tower 20*c*, moored to the sea (or lake) floor via mooring lines 28, that, in one aspect, includes a plurality of conic sections 22 as described in reference to FIG. 1A, including a composite top conic section 24 and composite intermediate conic sections 23*a*, 23*b* . . . 23*n* that will remain above the water-line 27*c* when the tower 20*c* is installed. Conic sections 23*o* through 23*z* and base cap 29 comprise the portion of the tower below the water-line and perform the buoyancy and ballasting functions of the floating tower. In one aspect, the conic sections 23*o*-23*z* may be produced utilizing composite materials by the process described in FIGS. 2-12 or with alternate materials suitable for use in the art of sub-surface off-shore platforms. The relatively lighter weight of composite materials compared to traditional metallic materials employed for the upper conic sections 24, 23*a*, 23*b* . . . 23*n* can substantially decrease the amount of buoyant materials required to float the overall offshore tower 20*c* and components to be mounted proximate the top of the tower 22*c*, such as blades, gears and generators.

Figure 2:
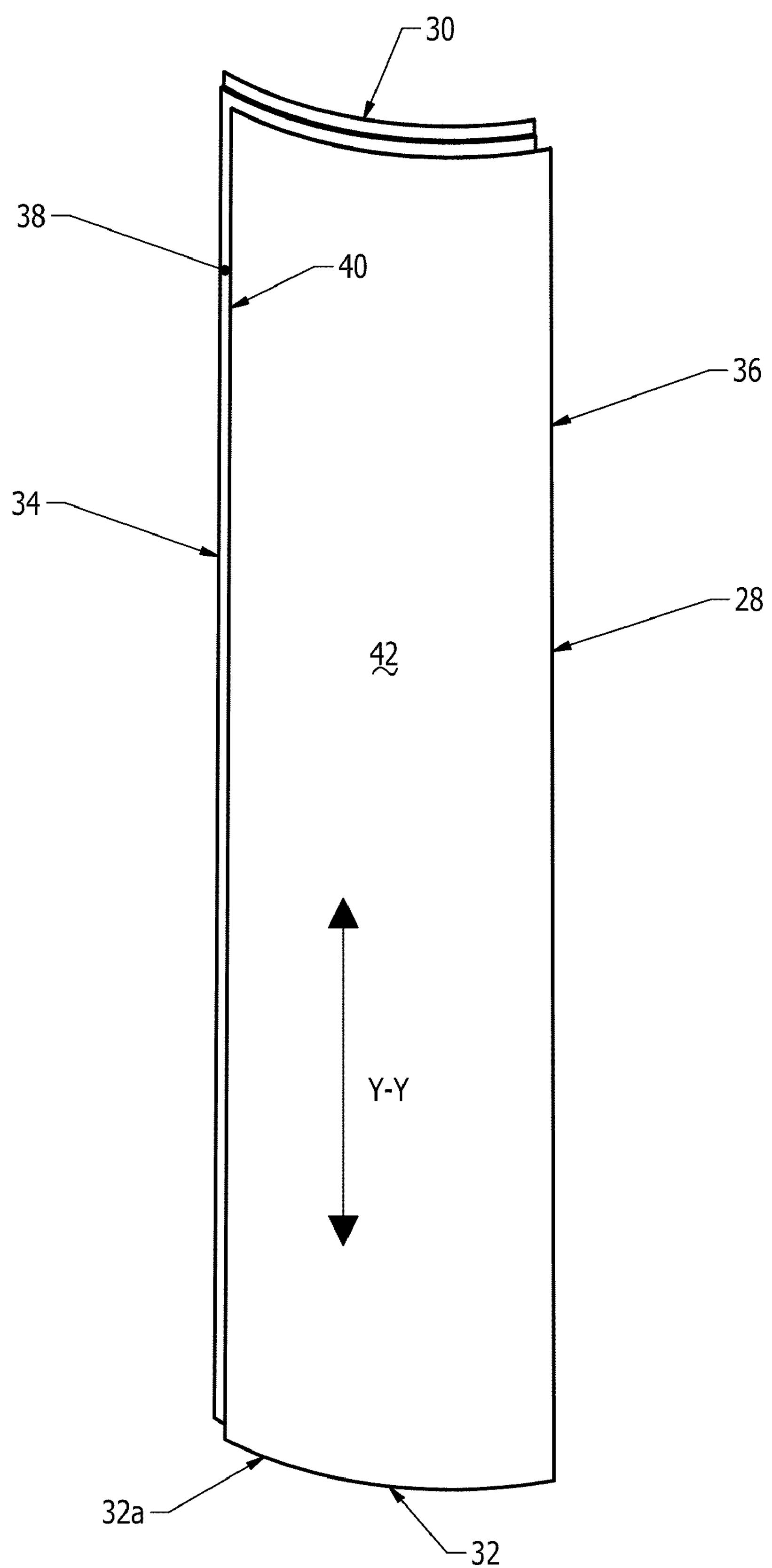
FIG. 2 is an isometric view of a single panel, from a conic section, in one form.

FIG. 2 shows an exemplary panel 28 having an upper edge or side 30, a lower edge or side 32 and tangential edges or longitudinal sides 34 and 36. The longitudinal direction of the panel is shown by axis y-y, i.e. the direction between the upper and lower edges. In one form, the panel 28 comprises a core layer, which may be a solid and continuous layer. In form, the core layer is comprised of a unitary structure of closed cell foam. Other suitable core materials may also be utilized, including, but not limited to, cellulose materials, specifically wood, such as Balsa, that is commonly used in the art. This core layer, in one form, is formed as a solid, arcuate panel upon which composite layers are placed to add rigidity and to carry radial, compression, and tensional forces of the tower.

Figure 3A:
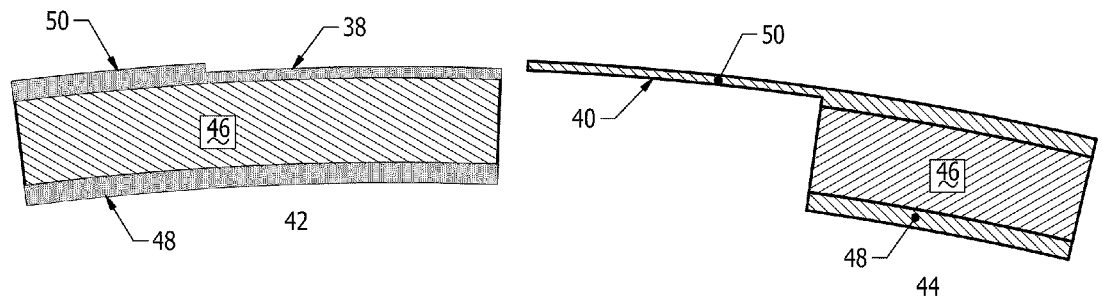
FIG. 3A shows cross-sectional view of two panels with half lap joints in one form.
Figure 3B:
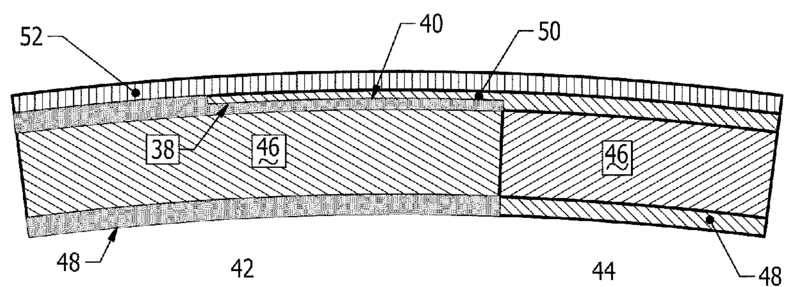
FIG. 3B is a cross-sectional view of the panels shown in FIG. 3A interconnected.

As described earlier in reference to FIG. 1A, several panels are coupled along their longitudinal sides to form each conic section. The edges of a panel, such as edges 34 and 36 of panel 28, may be coupled to adjoining panels using many different joining methods and arrangements. FIG. 3A shows a half-lap joint that may be utilized for coupling panels to form a conic section. In one aspect, the half-lap joint comprises a cheek surface 38 and a shoulder surface 40. The cheek and shoulder construction tends to ease the manufacture of each conic section and therefore would ease construction of the tower 20 (FIG. 1) as a whole. The shoulder surfaces 40 and cheek surfaces 38 of adjoining panels 42 and 44 are shown. These surfaces would normally be coated with an adhesive prior to assembly. Also shown is the core layer 46 that in this application is sandwiched between an inner composite layer 48 and an outer composite layer 50. To join or couple panels 42 and 44 along their respective longitudinal sides, resin or epoxy is normally applied to such surfaces and then shoulder surface 40 is placed on the cheek surface 38. The epoxy is then cured to bond the cheek and shoulder surfaces. The assembled or coupled panels 42 and 44 are shown in FIG. 3B. An outer, circumferentially-oriented layer 52 is also shown in this cross sectional view. In one aspect, such an outer layer is applied after joining all the panels as described in more detail in reference to FIGS. 4A and 4B.

Figure 3C:
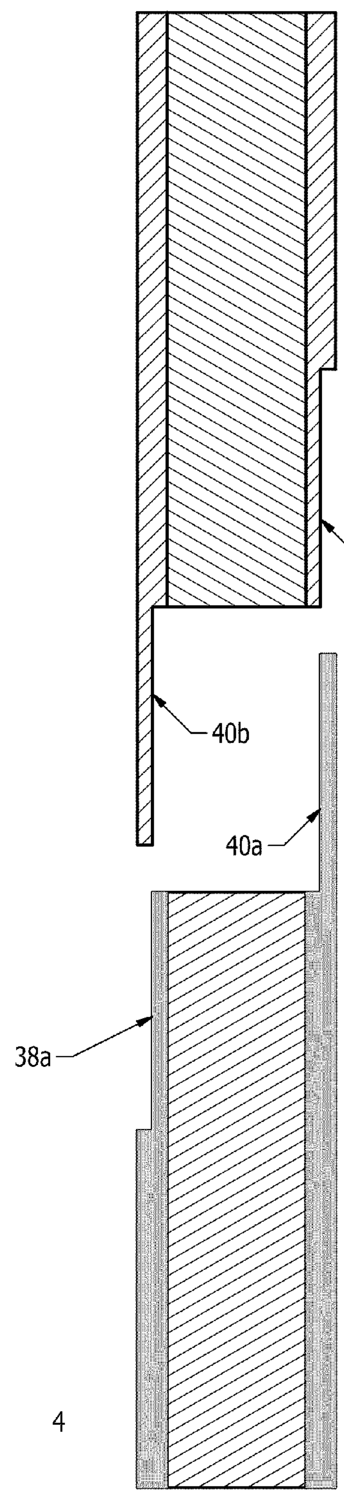
FIG. 3C shows cross-sectional view of two panels with a double half-lap (also referred to as full lap) joint in one form.
Figure 3D:
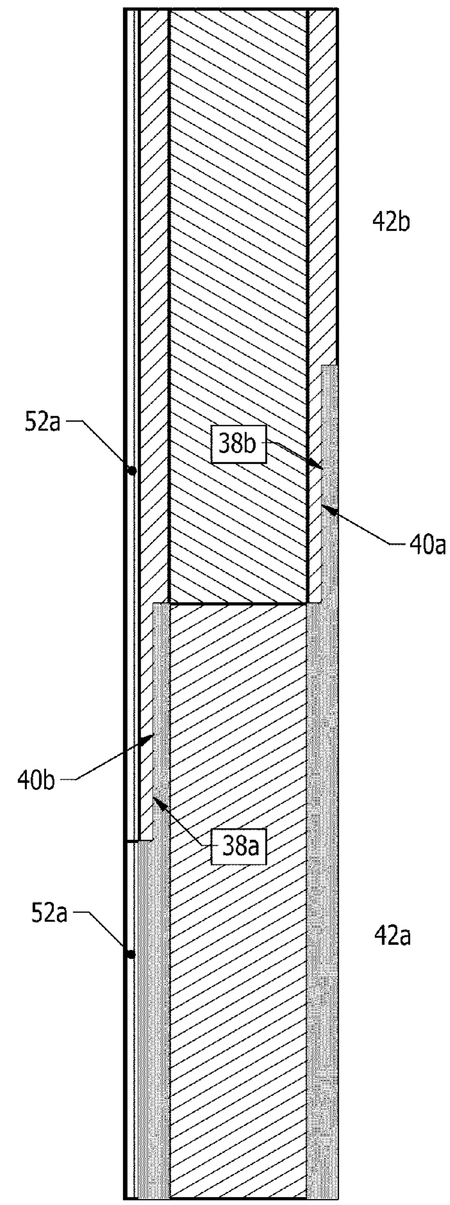
FIG. 3D is a cross-sectional view of the panels shown in FIG. 3C interconnected together.

FIG. 3C shows a double half-lap joint (also referred herein as a full-lap joint) that may be utilized for coupling panels to form a conic section or to join a unitary conic section to an adjacent unitary conic section. In one aspect, the full-lap joint comprises a cheek surface 38*a* and a shoulder surface 40*a* on one panel 42*a* and cheek surface 38*b* and a shoulder surface 40*b* on an adjoining panel 42*b*. In this configuration, the shoulder surface 40*b* of panel 42*b* is placed on the cheek surface 38*a* of panel 42*a*, while simultaneously the shoulder surface 40*a* of the panel 42*a* is placed on the cheek surface 38*b* of panel 42*b* to join the panels 42*a* and 42*b* along their respective longitudinal axes. The surfaces 38*a*, 38*b*, 40*a* and 40*b* are coated with a suitable adhesive prior to joining such surfaces. The adhesive is then cured to bond the panels 42*a* and 42*b* along their longitudinal sides. The joined or coupled panels 42*a* and 42*b* are shown in FIG. 3D. An outer, circumferentially-oriented layer 52*a* is also shown in this cross sectional view. In one aspect, such an outer layer is applied after joining all the panels as described in more detail in reference to FIGS. 4A and 4B.

Figure 4A:
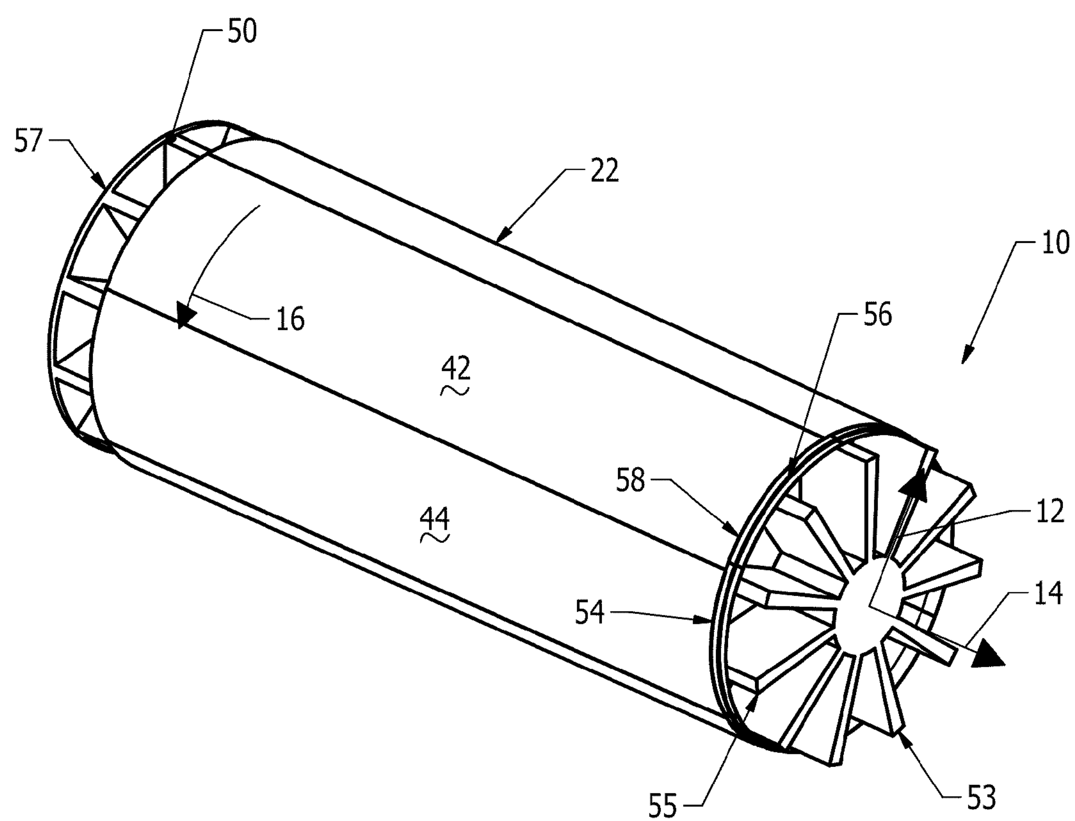
FIG. 4A is an isometric view of a plurality of panels placed upon a mandrel to form a conic section in one form.
Figure 10:
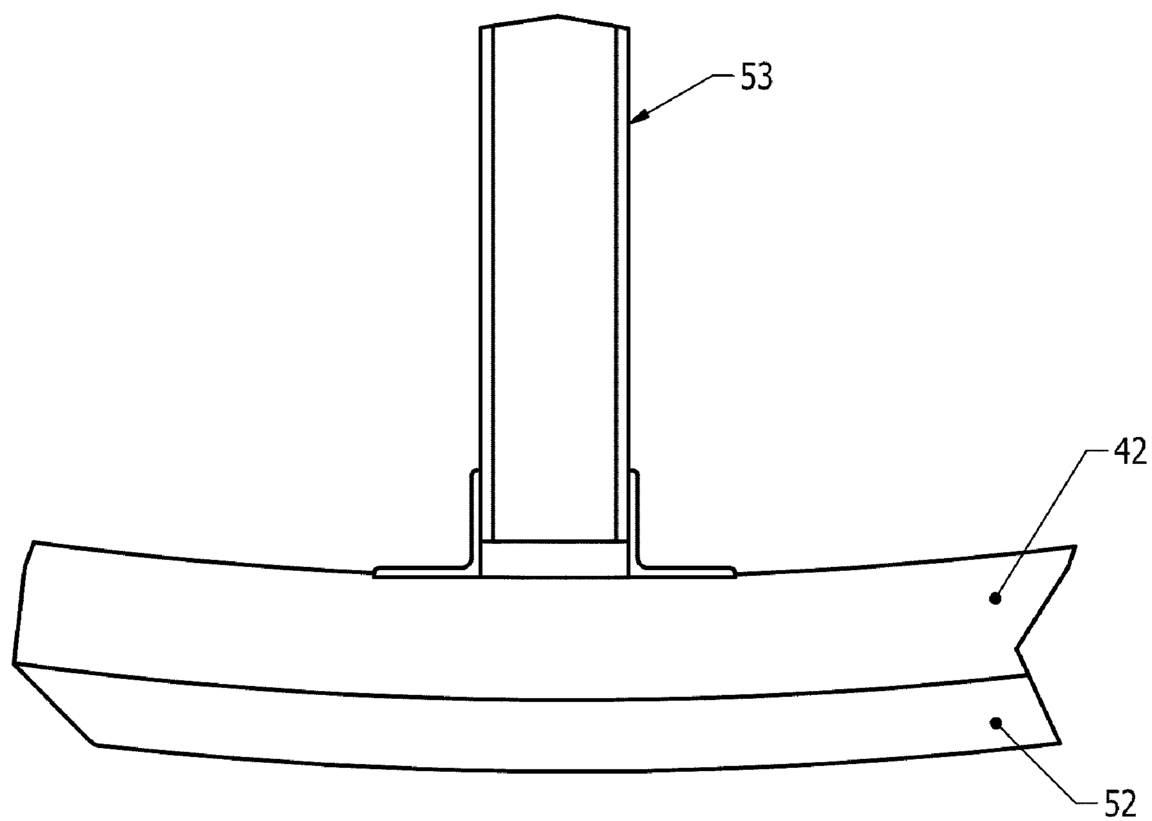
FIG. 10 is an end view of a mandrel attachment to a panel in one form.

FIG. 4A shows an exemplary manner of joining various panels to form a conic section, according to one embodiment of the disclosure. FIG. 4A shows a mandrel 53 dimensioned to form a selected conical section using panels described herein. In one aspect, the mandrel 53 includes a bulkhead 57 and a number of longitudinal and radial spokes 55. The mandrel 53 has an axis system 10 that includes a longitudinal axis 14, a radial axis 12 and a tangential axis 16. The bulk head 57, spokes 55 and the core panels define the mandrel system in normal operation. The term mandrel is used herein to indicate the portion to which the core panels are temporarily affixed. FIG. 4A illustrates how the adjoining panels 42, 44 and other panels are mounted on a mandrel 53. An attachment bracket, such as shown in FIG. 10 is one example of a method to attach the panels 42, 43, etc. to the mandrel 53 to facilitate winding the substantially circumferentially aligned panels as described in reference to FIG. 4B. The panels 42, 44, etc. are placed longitudinally along the longitudinal axis 14 of the mandrel 53. The panels are coupled or joined together around the mandrel 53 to form a base enclosure or a base structure. The adjoining panels on the mandrel 53 may be joined in any suitable manner, including the manners described in reference to FIGS. 3A and 3B or 3C and 3D.

Figure 4B:
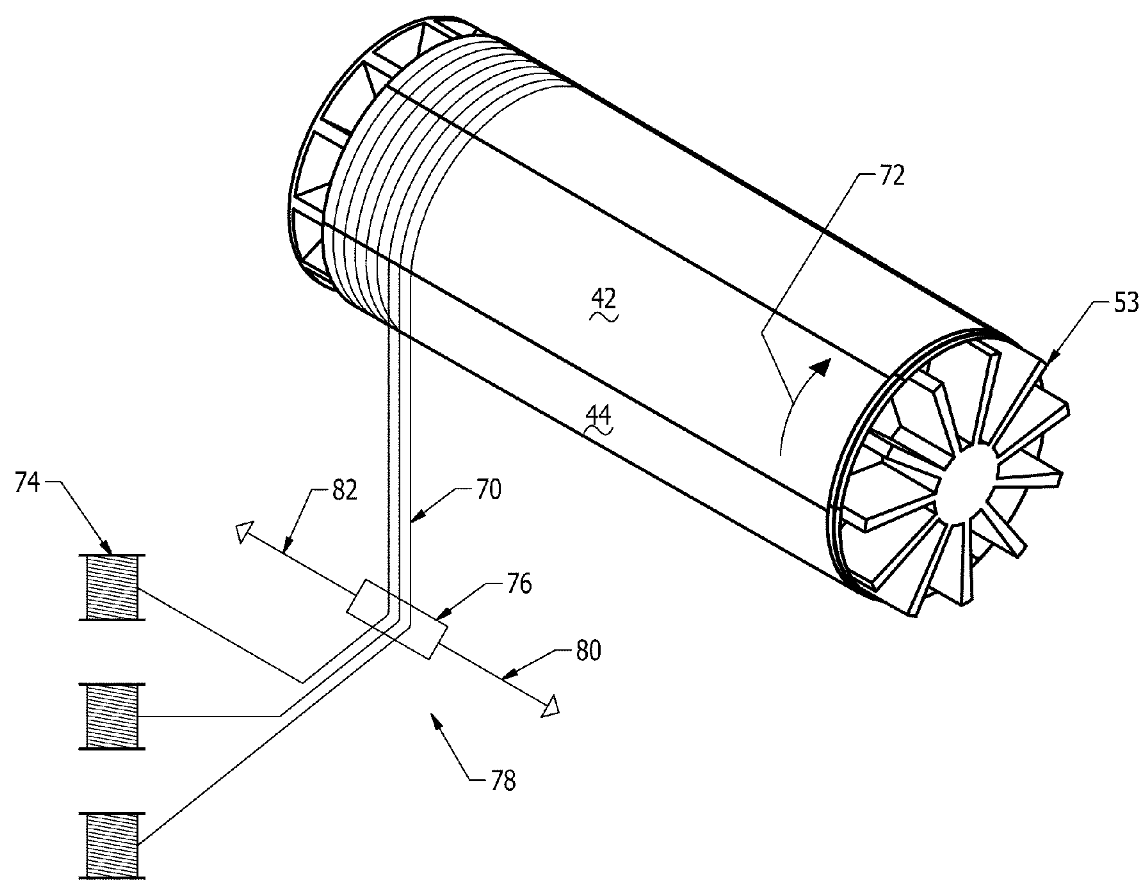
FIG. 4B is an isometric view of a process of winding an outer layer onto the sections in one form.

Once the individual panels are placed upon the mandrel 53, as shown in FIG. 4A, the entire mandrel 53 is rotated about the axis 14 in direction 72 as shown in FIG. 4B whereupon a layer of circumferential fibers 70 are disposed on the surface of the panels. In one form, the circumferential fibers 70 are wound off a plurality of spools 74 and through a resin bath 76. While the process of FIG. 4B shows three fibers being wound at one time, more or fewer fibers may be wound simultaneously. As the fibers are wound onto the panels 42, the bath/spool assembly 78 moves longitudinally along directions of travel 80 and 82. In one form, the bath/spool assembly 78 is slaved to the mandrel 53 rotation either electronically or mechanically, such that the distance of longitudinal travel 80-82 corresponds to the degree of rotation of the mandrel 53. In one aspect, this step is accomplished onsite, as a single mandrel 53 is capable of producing an unlimited supply of conic sections for one or more towers. Thus, the completed conic sections 22 (FIG. 1A) require very little transportation expense, as they can be formed onsite from the individual panels 42.

Once the base section 26 (FIG. 1A) is completed, it may be placed in an upright position and fastened to and/or embedded in a structural base member, such as a concrete pad. The longitudinally upward edge 54 (FIG. 4A) of each section 22 (except the top section 24) comprises an attachment joint to the succeeding section. The bottom edge, in one form, as previously disclosed, may utilize a half-lap type, or double half-lap type joint that includes a cheek 56 and shoulder 58 shown in FIGS. 5A and 5B. The upper section to be installed comprises a mating joint, of opposite configuration to the adjoining lower section. Prior to adjoining the upper and lower sections, adhesive may be applied to the adjoining cheek and should surfaces. The top section 24 would in one form comprise a joint operatively configured to facilitate attachment of a top cover, nacelle, or other structure via any suitable mechanism, including, but not limited to, a bolted flange.

Figure 5A:
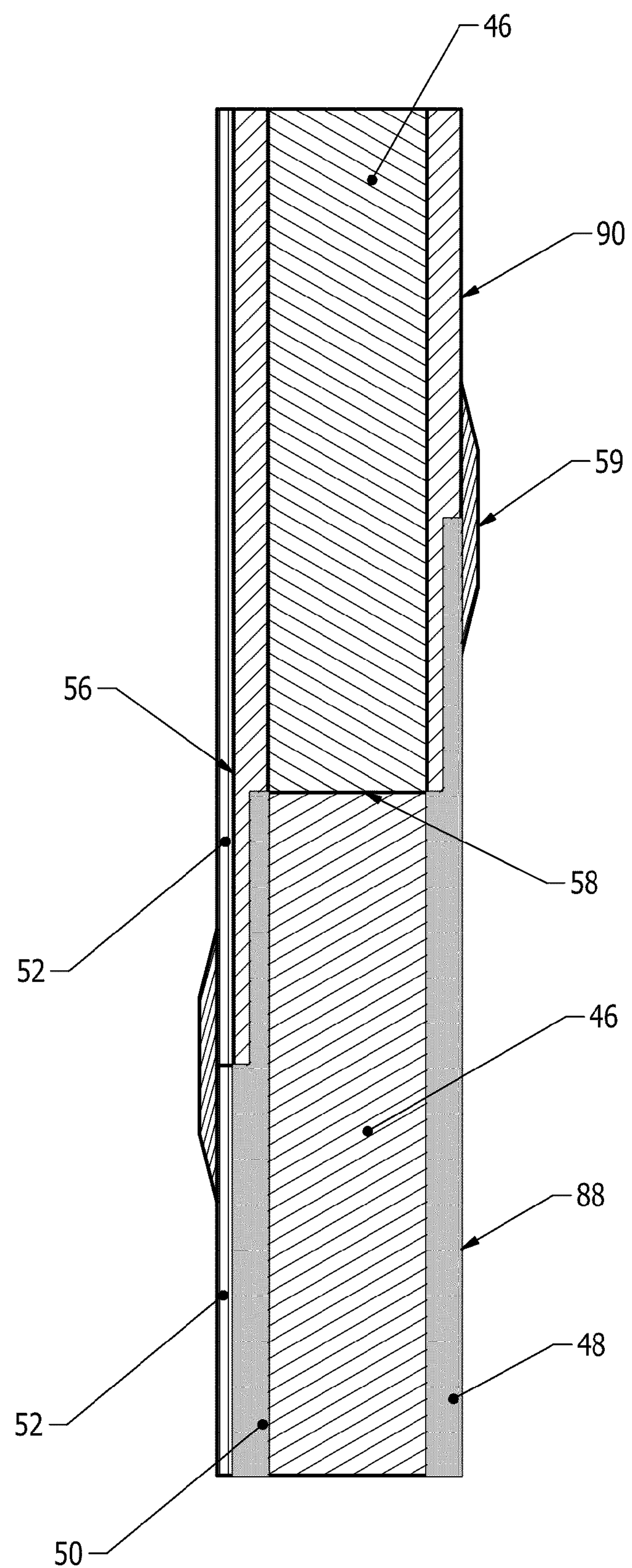
FIG. 5A is a cross-sectional view of a full-lap joint (as illustrated in FIG. 3D) interconnected together with a supplemental composite laminate to enhance bonding between adjacent sections, according to one embodiment of the disclosure.

Also shown in FIG. 5A is a butt and strap joint 59 that substantially comprises a layer or multiple layers of a suitable material, which overlaps adjoining sections 88 and 90 to transfer forces (such as, tensile, compressive and/or torsional forces) between the section 88 and section 90.

Figure 5B:
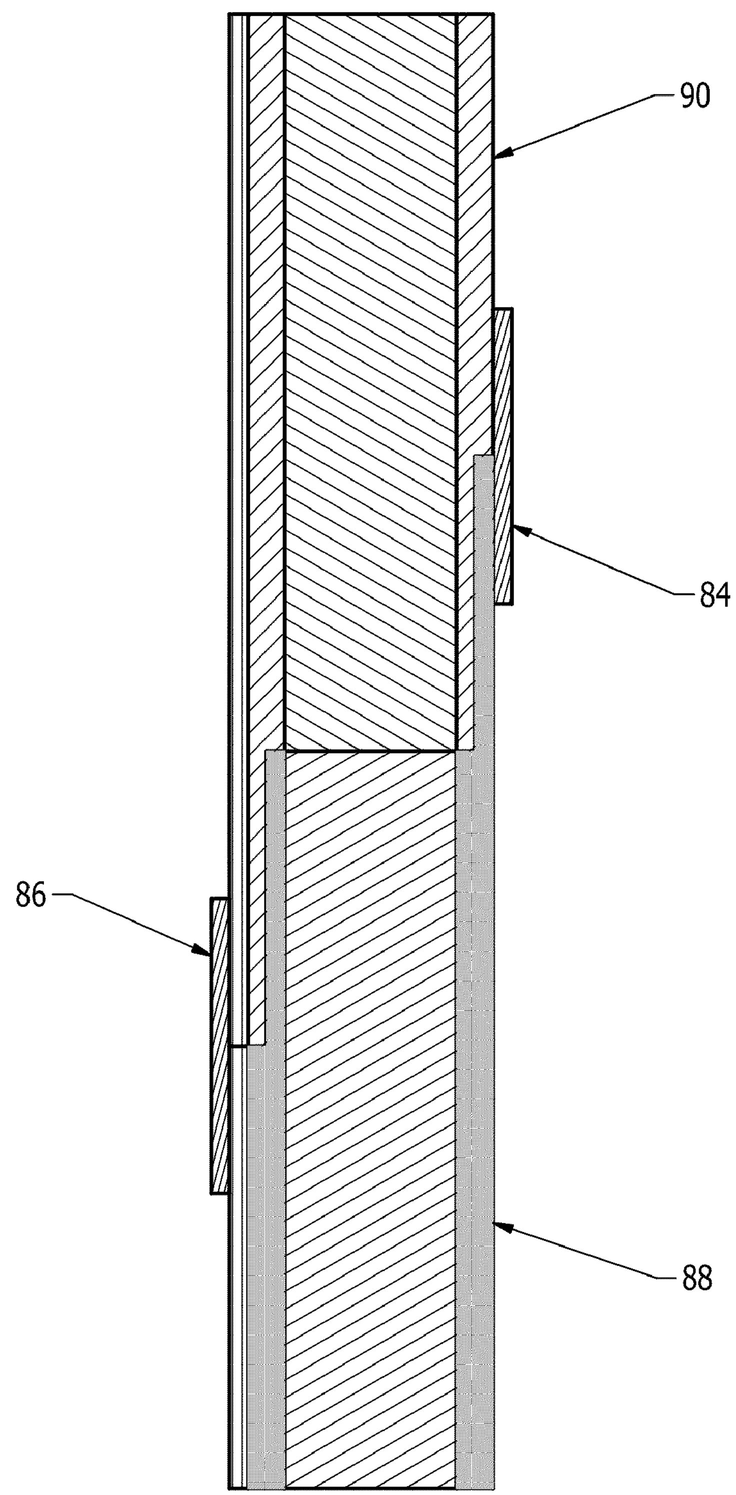
FIG. 5B is a cross-sectional view of a full lap joint (as illustrated in FIG. 3D) interconnected together with a supplemental composite laminate to enhance bonding between adjacent sections, according to another embodiment of the disclosure.

In another form, internal hoop bands 84 and external hoop bands 86 may be utilized to transfer forces between adjoining sections, as shown in FIG. 5B. The hoop bands may include a layer or multiple layers of material that overlap adjoining sections. In one aspect, the hoop bands may be substantially rigid, cylindrical or partial cylindrical members that are formed (or pre-formed) to fit an outer surface of a conic section joint, such as a joint 27*a* between conic section 23*a* and 23*b* (FIG. 1A) and then attached via adhesive. Both the butt and strap joint, and the hoop bands function to transfer forces (such as: tensile, compressive and/or torsional) between one section 88 to the adjoining section 90.

Figure 6:
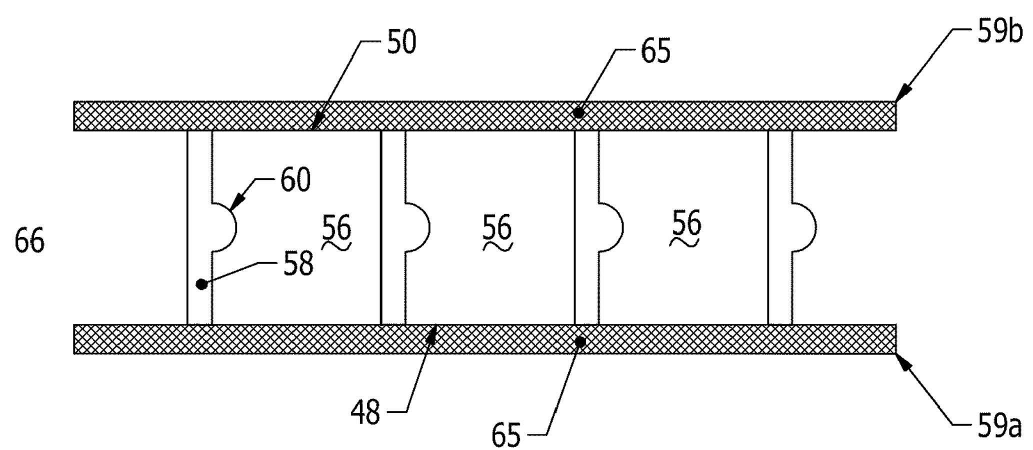
FIG. 6 is a cross-sectional end (plan) view of a single panel in one form.
Figure 7:
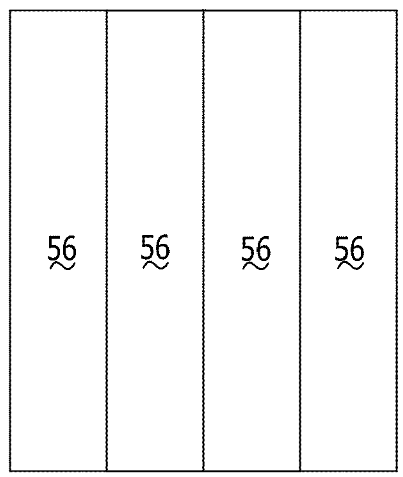
FIG. 7 is a cross-sectional side view of a single panel in one form.
Figure 8:
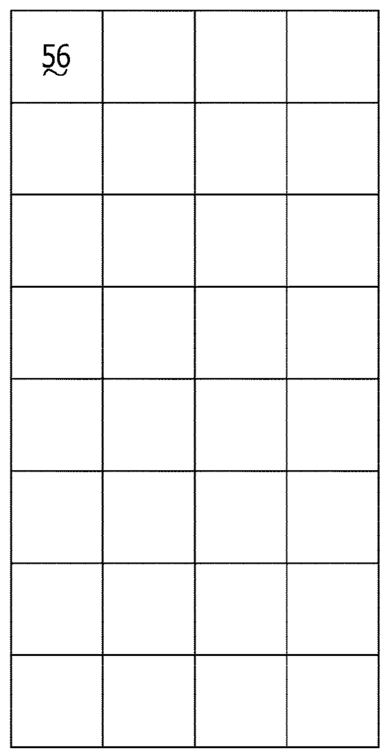
FIG. 8 is a cross-sectional side view of a single panel in one form.

FIG. 6 shows a plan cutaway view of another embodiment of a panel 66 comprising a plurality of core cells 56 that may be longitudinally aligned, extending substantially the length of the panel 66 as shown in FIG. 7. Alternatively, the core cells 56 may be arranged in a grid or a matrix form, such as shown in FIG. 8. Individual cells 56 (FIGS. 6, 7 & 8) may be interconnected by a glass/resin layer 58 for reinforcement. In one form, a resin transfer line 60 (FIG. 6) may be utilized between core cells 56 to facilitate injection of a resin into the glass/resin layer 58 (FIG. 6). The panel 60 is shown to also include an inner layer 48 and an inner layer 50.

Upon the inner layer 48 and the outer layer 50 (FIGS. 6 and 9) a reinforcing layer, such layer 59*a* on layer 48 and layer 59*b* on layer 50 may be applied. In one aspect, the reinforcing layers 59*a* and 59*b* may comprise fiberglass or other suitable material. In one aspect, layers 59*a* and 59*b* comprise substantially longitudinally aligned fibers 65. (FIGS. 6 and 9) By incorporating the substantially longitudinally aligned fibers 65 adjacent to the inner and outer layers 48 and 50. The laminate within a completed panel, such as panel 42 (FIG. 2) utilizing the structure shown in FIG. 6 will exhibit substantially higher axial strength and stiffness to resist the large lateral forces and overturning bending moments present in the wind turbine towers. Individual panels, such as panels 42 (FIG. 2) may be produced offsite, such as at a manufacturing plant, wherein laminations can be manufactured relatively easily and with high degree of quality control. The individual panels 42 (FIG. 2) may then be transported to an onsite location and mounted onto the mandrel 53 (FIG. 4A) to make an individual conic section as shown in FIG. 4B that might otherwise be too large in diameter for efficient transport, such as via a truck, from an offsite location to an onsite location.

Figure 9:
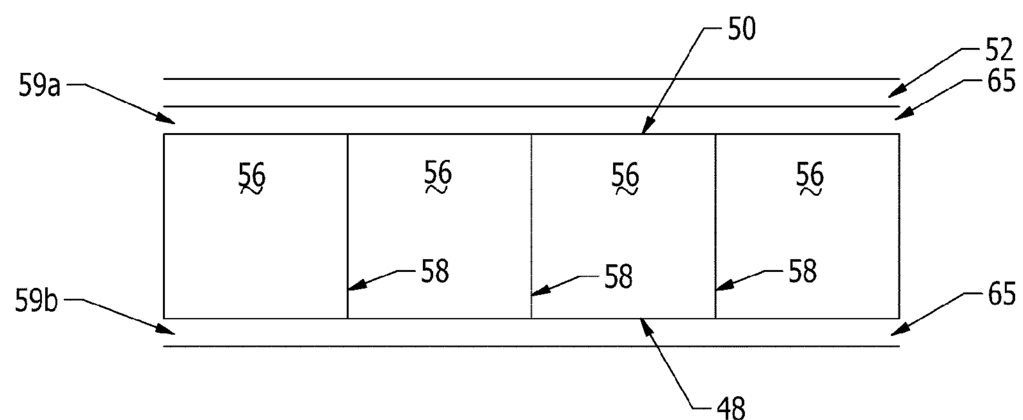
FIG. 9 is a cross-sectional end (plan) view of a single panel in one form.

FIG. 9 shows a cross section of the outer surface of a completed panel comprising a plurality of core cells 56, inner layer 48, outer layer 50, and reinforcing layers 59*a* and 59*b* comprising substantially longitudinally aligned fibers, and reinforcing layer 52 comprising substantially circumferentially aligned fibers. The glass/resin reinforcement layers 58 are also shown for clarity. In one form, the core cells 56 with the inner layer 48 and outer layer 50 are produced using the methods described in U.S. Pat. Nos. 5,462,623 filed Oct. 31, 1995 "Method of Production of Reinforced Foam Cores", 5,589,243 filed Dec. 31, 1996 "Reinforced Foam Cores and Method and Apparatus of Production", 5,834,082 filed Nov. 10, 1998 "Reinforced Foam Cores and Method and Apparatus of Production", 6,740,381 filed May 25, 2004 "Fiber Reinforced Composite Cores and Panels", 7,393,577 filed Jul. 1, 2008 "Fiber Reinforced Composite Cores and Panels" each incorporated fully herein by reference. It should be noted that the various dimensions given herein are for explanation purposes only and are not intended to limit the claims in any manner.

For the purpose of this disclosure, the term offsite means a facility distant from the location of placing or erecting large structures, such as a manufacturing or an assembly facility. The term onsite means a place or facility from where conic sections made according to the disclosure herein may be easily transported to the location where the finished large structure is to be placed or erected. With respect to the land-based wind turbine towers, an onsite facility may be located near the place of the tower erection. In such cases, the conic sections may be made and formed into the tower without resorting to transportation of the conical sections over normal roads, highways etc that are not conducive to the transportation of such large structures. For off-shore wind turbine towers, an onsite facility may be located on a waterway or convenient port location from which conic sections are fabricated and potentially erected into full towers prior to deployment offshore.

Thus, in one aspect the disclosure herein provides a method of making a selected structure, which method in one embodiment includes: providing a plurality of members, each member comprising a composite material and configured to be coupled to at least one other member along a longitudinal side thereof; coupling onsite the plurality of members along their respective longitudinal sides to form a base enclosure; reinforcing onsite the base enclosure with a composite material to form the selected structure. In another aspect, the method further includes placing the plurality of members on a mandrel before coupling onsite the plurality of members. In one aspect, reinforcing onsite the base structure may be accomplished by placing composite fibers and a resin around the base enclosure and then curing the resin to form a unified structure. In another aspect, providing the plurality of members may include making each such member using a process that includes: providing a core member; reinforcing the core member with composite fibers substantially along a longitudinal direction of the core member; and applying and curing a resin on the composite fibers. In one aspect, the panels may be interconnected using any suitable method, including using a half-lap joint, and a double half-lap joint.

In another aspect, the disclosure provides a structure, such as a tower, which in one embodiment may include: a plurality of serially connected conic sections, wherein at least one conic section includes a base section that includes a plurality of longitudinally interconnected panels and a composite material layer around the base section. In another aspect, the tower may further include a band around a joint between the at least one conic section and an adjoining conic section configured to provide a reinforcement at the joint. In one configuration, the tower includes an upper section comprising one or more metallic conic sections and a lower section comprising the at least one conic section. In another configuration, the tower includes a lower section that includes one or more conic sections made from a material suitable for placement under water and wherein the lower section is further configured to be moored to a sea bed. In one aspect, the conic sections may be connected to each other by a half-lap joint or a double half-lap joint.

While the present disclosure is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those of ordinary skilled in the art. The disclosure in its broader aspects is therefore not limited to the specific details, representative apparatus and methods, and illustrative examples shown and described. Accordingly, departures may be made from such details without departing from the spirit or scope of general concepts described herein.

The invention claimed is:

1. A method of providing a selected structure, comprising:
- providing a plurality of composite members, each composite member having a joining element for coupling adjoining composite members along a longitudinal sides thereof;
- coupling onsite the plurality of composite members along longitudinal sides thereof to form a base enclosure; and
- reinforcing the base enclosure onsite, wherein the reinforcing includes: placing composite fibers and a resin around the base enclosure and curing the resin to form a unified structure.

2. The method of claim 1 further comprising placing the plurality of composite members on a mandrel before coupling onsite the plurality of composite members.

3. The method of claim 1 wherein providing the plurality of composite members comprises making each composite member using a process that includes:
- providing a core member;
- reinforcing the core member with composite fibers substantially along a longitudinal direction of the core member; and
- applying and curing a resin on the composite fibers.

4. The method of claim 3 further comprising:
- providing along a first longitudinal side of each composite member a cheek and along a second longitudinal side a shoulder in a manner that enables the plurality of composite members to be interconnected with one another along their longitudinal sides.

5. The method of claim 4 wherein the cheek and shoulder interconnect to form a joint that is one of: (i) a half-lap joint; and (ii) a double half-lap joint.

6. The method of claim 1 further comprising reinforcing the base enclosure by one of: (i) a composite material; (ii) a non-composite material; and (iii) a combination of a composite and non-composite material.

7. A method of providing a selected structure, comprising:
- providing a first conic section that includes a plurality of longitudinally interconnected panels that form a base enclosure, the plurality of longitudinally interconnected panels including a composite material layer on the plurality of interconnected panels, and a second composite material layer, wherein the second composite layer is applied onsite by placing composite fibers and a resin around the base enclosure and curing the resin to form a unified structure;
- providing a second conic section; and
- serially joining the first and second conic sections to form at least a part of a tower.

8. The method of claim 7 further comprising reinforcing a joint between the first and second conic sections with a band around the joint.

9. The method of claim 7 wherein the second conic section is smaller in diameter than the first conic section and is made using a metal.

10. The method of claim 7 wherein the second conic section is made from a material suitable for placement under water.

11. The method of claim 7 wherein the composite material layer includes fibers longitudinally arranged on the panel.

12. A tower, comprising:
- a plurality of serially connected conic sections, wherein at least one conic section includes a base section that includes a plurality of longitudinally interconnected panels and a composite material layer around the base section, the composite material layer comprising composite fibers and a resin placed around the base section and cured onsite to form a unified structure.

13. The tower of claim 12 further comprising a band around a joint between the at least one conic section and an adjoining conic section configured to provide a reinforcement at the joint.

14. The tower of claim 12 wherein the tower includes an upper section comprising one or more metallic conic sections and a lower section comprising the at least one conic section.

15. The tower of claim 12 wherein the tower includes a lower section that includes one or more conic sections made from a material suitable for placement under water and wherein the lower section is further configured to be moored to a sea bed.

16. The tower of claim 12 wherein at least some of the panels in the interconnected panels include longitudinally placed reinforcement fibers configured to provide greater strength to such panels along a longitudinal direction of such panels compared to a radial direction of such panels.

17. The tower of claim 12 wherein the longitudinally interconnected panels are interconnected by a joint selected from a group consisting of: (i) a half-lap joint; and (ii) double half-lap joint.

18. The tower of claim 12 wherein the conic sections are serially connected by a joint selected from a group consisting of: (i) a half-lap joint; and (ii) double half-lap joint.

* * * * *